(12) United States Patent
Li et al.

(10) Patent No.: US 11,767,746 B2
(45) Date of Patent: Sep. 26, 2023

(54) INTEGRATED WELLHEAD DEVICE FOR FILTERING INJECTED AND PRODUCED GASES

(71) Applicant: Southwest Petroleum University, Chengdu (CN)

(72) Inventors: Yongming Li, Chengdu (CN); Tai Chang, Chengdu (CN); Yu Peng, Chengdu (CN); Yibo Li, Chengdu (CN); Ang Luo, Chengdu (CN); Shuxuan Li, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 176 days.

(21) Appl. No.: 17/512,684

(22) Filed: Oct. 28, 2021

(65) Prior Publication Data

US 2023/0058285 A1    Feb. 23, 2023

(30) Foreign Application Priority Data

Aug. 20, 2021   (CN) .......................... 202110958960.9

(51) Int. Cl.
*E21B 43/34*    (2006.01)
*B01D 46/62*    (2022.01)
(Continued)

(52) U.S. Cl.
CPC .............. *E21B 43/34* (2013.01); *B01D 46/62* (2022.01); *B01D 53/48* (2013.01); *B01D 53/62* (2013.01);
(Continued)

(58) Field of Classification Search
CPC ......... E21B 43/34; E21B 43/13; B01D 46/62; B01D 53/48; B01D 53/62;
(Continued)

(56) References Cited

U.S. PATENT DOCUMENTS

| 4,106,562 | A | * | 8/1978 | Barnes | ................... B01D 35/02 166/227 |
| 5,132,011 | A | * | 7/1992 | Ferris | ................... B01D 17/042 210/519 |

(Continued)

FOREIGN PATENT DOCUMENTS

| CN | 113082860 A | 7/2021 |
| CN | 113088358 A | 7/2021 |
| CN | 113318507 A | 8/2021 |

*Primary Examiner* — James G Sayre
(74) *Attorney, Agent, or Firm* — Nitin Kaushik

(57) ABSTRACT

An integrated wellhead device for filtering injected and produced gases is provided. The wellhead device comprises a horizontal tank body that is internally provided with an injected gas filtering system and a produced gas filtering system. The injected gas filtering system is internally provided with an oxygen removal chamber. A gas inlet of the injected gas filtering system is connected with an injected high-pressure gas source, and a gas outlet of the injected gas filtering system is connected with a gas injection well casing of Christmas tree. The produced gas filtering system is internally equipped with an oxygen removal chamber, a sulfur removal chamber and a carbon dioxide removal chamber. A gas inlet of the produced gas filtering system is connected with a gas production tubing of the Christmas tree, and a gas outlet of the produced gas filtering system is connected with a produced gas transmission pipe.

10 Claims, 7 Drawing Sheets

(51) Int. Cl.
*B01D 53/48* (2006.01)
*B01D 53/62* (2006.01)

(52) U.S. Cl.
CPC .... *B01D 2257/104* (2013.01); *B01D 2257/30* (2013.01); *B01D 2257/504* (2013.01)

(58) Field of Classification Search
CPC .......... B01D 2257/104; B01D 2257/30; B01D 2257/504; B01D 53/00
See application file for complete search history.

(56) References Cited

U.S. PATENT DOCUMENTS

2009/0152213 A1\* 6/2009 Frazier ............... B01D 21/0006
210/800
2011/0277670 A1\* 11/2011 Self ..................... B01D 61/027
210/768
2012/0012310 A1\* 1/2012 Friesen ..................... C10L 3/10
166/267

\* cited by examiner

INTEGRATED WELLHEAD DEVICE FOR FILTERING INJECTED AND PRODUCED GASES

CROSS-REFERENCE TO RELATED APPLICATIONS

The application claims priority to Chinese patent application No. 202110958960.9, filed on Aug. 20, 2021, the entire contents of which are incorporated herein by reference.

TECHNICAL FIELD

The present disclosure pertains to the technical field of gas field development, and in particular to an integrated wellhead device for filtering injected and produced gases.

BACKGROUND

Gas-lift drainage gas recovery from liquid-loading gas wells is an important technology in gas field development, and plays an important role in stabilizing and increasing production of gas wells. However, if the oxygen content of the injected high-pressure gas is too high, oxygen and natural gas are prone to explosion in high-temperature formations, and high-content oxygen is likely to cause corrosion and perforation of the wet wellbore, significantly reducing the recovery efficiency of the gas well. At the same time, the formation gas produced from the gas wells will inevitably be mixed with oxygen, hydrogen sulfide, carbon dioxide and other impurities. When mixed with surface oxygen, the formation gas not only has the risk of explosion, but also has a certain corrosive effect on the surface of the pipeline. Therefore, the life cycle of the pipeline may be shortened if it transmits such gas for a long time. At present, there is no relevant device to solve the above technical problems.

SUMMARY

In response to the above problems, the present disclosure aims to provide an integrated wellhead device for filtering injected and produced gases.

The technical solution of the present disclosure is as follows:

an integrated wellhead device for filtering injected and produced gases, comprising a horizontal tank and spacer plates inside the horizontal tank, wherein the spacer plates divide the internal space of the horizontal tank into an upper space, a lower space and a right space, the upper space and the lower space are connected to the right space, and an injected gas filtering system and a produced gas filtering system are provided in the horizontal tank;

the injected gas filtering system comprises an injected gas inlet, an injected gas channel, an oxygen removal chamber, and an injected gas outlet that are connected in sequence; the injected gas inlet is fitted on the top of the horizontal tank, the injected gas channel penetrates the spacer plate and is connected with the oxygen removal chamber located in the lower space, and the injected gas outlet is fitted at the bottom of the horizontal tank;

the produced gas filtering system comprises a filtering system, a quasi-overpressure gas direct drainage system, and an overpressure gas direct drainage system;

the filtering system comprises a produced gas inlet, a gas deposition chamber, a gas removal chamber, a gas retention chamber, a gas acceleration channel, and a produced gas outlet that are connected sequentially; the gas removal chamber comprises oxygen removal chamber two, sulfur removal chamber and carbon dioxide removal chamber that are connected in any order; the right space is the gas retention chamber; the produced gas inlet is located at the top left end of the horizontal tank, and the gas deposition chamber and the gas removal chamber are located in the upper space, the gas acceleration channel is arranged in the lower space and penetrates the gas removal chamber 1, and the produced gas outlet is set at the left end of the horizontal tank; the gas deposition chamber is provided with a pressure monitoring device;

the quasi-overpressure gas direct drainage system comprises a gas flow channel, a safety ball valve, a spring one, a spring fixing block one, and a quasi-overpressure gas direct drainage channel that are connected in sequence; the spring fixing block one is set on the spacer plate, and the quasi-overpressure gas direct drainage channel is connected to the gas retention chamber;

the overpressure gas direct drainage system comprises a safety floating plate, a safety spring, a safety baffle, an overpressure gas drainage chamber, and a safety gas outlet that are connected in sequence; the safety baffle is provided with a overpressure gas drainage channel; the safety floating plate is cut from the spacer plate, the safety baffle is located in the lower space facing the gas deposition chamber, a gap is left between the safety baffle and the spacer plate to provide a gas flow channel when the gas is overpressured, and the safety gas outlet is arranged at the bottom of the horizontal tank.

Preferably, the horizontal tank comprises a left end cap, a straight section, and a right end cap; the left end cap is connected to the left end of the straight section and is detachable, and the right end of the straight section is connected to the right end cap and is detachable.

Preferably, the gas acceleration channel comprises an acceleration channel of the acceleration cylinder and an acceleration channel of the acceleration nozzle, and the right end of the acceleration cylinder is connected to the gas retention chamber, the left end of the acceleration cylinder is connected with the right end of the acceleration nozzle, and the left end of the acceleration nozzle is connected with the gas outlet; the acceleration cylinder is fixed by an acceleration cylinder positioning plate.

Preferably, wherein the acceleration channel of the acceleration cylinder comprises a first-stage acceleration channel, a straight section one, a second-stage acceleration channel, and a straight section two that are sequentially connected from right to left;

the acceleration channel of the acceleration nozzle comprises a third-stage acceleration channel and a straight section three that are connected from right to left;

the internal diameter of the left end of the first-stage acceleration channel is smaller than that of the right end, the internal diameter of the left end of the second-stage acceleration channel is smaller than that of the right end, and the internal diameter of the left end of the third-stage acceleration channel is smaller than that of the right end.

Preferably, a speed-up cylinder is provided between the first and second gas removal chambers; a speed-up cylinder channel is set at the center of the speed-up cylinder to connect the two oxygen removal chambers; the internal diameter of the left end of the speed-up cylinder channel is greater than that of the right end.

Preferably, a sieve plate one is provided between the first gas removal chamber and the gas deposition chamber, a sieve plate two provided between the first gas removal chamber and the speed-up cylinder, a sieve plate three provided between the speed-up cylinder and the second gas removal chamber, a sieve plate four provided between the second gas removal chamber and the third gas removal chamber, and a sieve plate five provided between the third gas removal chamber and the gas retention chamber.

Preferably, the number of sieve holes of the sieve plates one, sieve plates two, sieve plates three and sieve plates five decreases in order, and the number of holes of the sieve plate four is the same as that of the sieve plate one.

Preferably, the sieve plate five is provided with a fixing plate at its right end.

Preferably, a left baffle clamping plate is provided in the horizontal tank and comprises a upper left baffle clamping plate set inside the gas deposition chamber and a lower left baffle clamping plate set between the overpressure gas drainage chamber and the oxygen removal chamber one; the top of the upper left baffle clamping plate is connected with the internal top wall of the horizontal tank, and the height of the upper left baffle clamping plate is less than that of the upper space; the upper and lower ends of the lower left baffle clamping plate are respectively connected with the spacer plate and the internal bottom wall of the horizontal tank.

Preferably, the upper left baffle clamping plate is provided with a spring fixing block two on the right, at the right end of the spring fixing block two is provided with a spring two, and at the right end of the spring two is provided with a hold-down plate.

The present disclosure has the following beneficial effects:
the present disclosure integrates an injected gas filtering system and a produced gas filtering system. The injected gas filtering system is used to remove oxygen in the injected high-pressure gas, and the produced gas filtering system is used to remove oxygen, sulfur and carbon dioxide in the produced gas. The two systems can be operated at the same time, and only need to be installed between the wellhead and the gas production pipe, without major modification of the surface pipeline. It is convenient to install and highly applicable, greatly improving the safety of gas wells, with a good application prospect.

BRIEF DESCRIPTION OF DRAWINGS

In order to explain the embodiments of the present disclosure or the technical solutions in the prior art more clearly, the following will make a brief introduction to the drawings needed in the description of the embodiments or the prior art. Obviously, the drawings in the following description are merely some embodiments of the present disclosure. For those of ordinary skill in the art, other drawings can be obtained based on these drawings without any creative effort.

DETAILED DESCRIPTION OF THE EMBODIMENTS

The present disclosure is further described with reference to the drawings and embodiments. It should be noted that the embodiments in this application and the technical features in the embodiments can be combined with each other without conflict. It is to be noted that, unless otherwise specified, all technical and scientific terms herein have the same meaning as commonly understood by those of ordinary skill in the art to which this application belongs. "Include" or "comprise" and other similar words used in the present disclosure mean that the component or object before the word covers the components or objects listed after the word and its equivalents, but does not exclude other components or objects.

In the present disclosure, the terms "first", "second", etc. are used to distinguish similar objects, but not to describe a specific order or sequence, in the absence of any indication to the contrary. The terms "upper", "lower", "left", "right", etc. are usually used in relation to the orientation shown in the attached figures, or in relation to the vertical, perpendicular or gravitational direction of the components themselves; similarly, for ease of understanding and description, "internal/inside", "external/outside", etc. refer to the inside and outside relative to the contour of each component itself. However, the above nouns of locality are not intended to limit the present disclosure.

Figure 1:
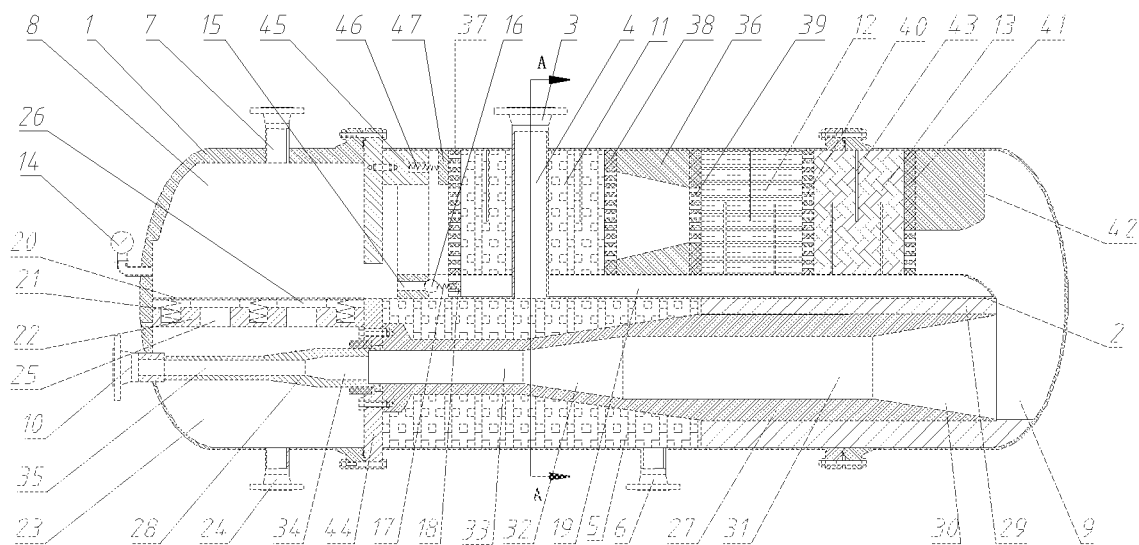
FIG. 1 is a schematic structural diagram of the integrated wellhead device for filtering injected and produced gases of the present disclosure.
Figure 2:
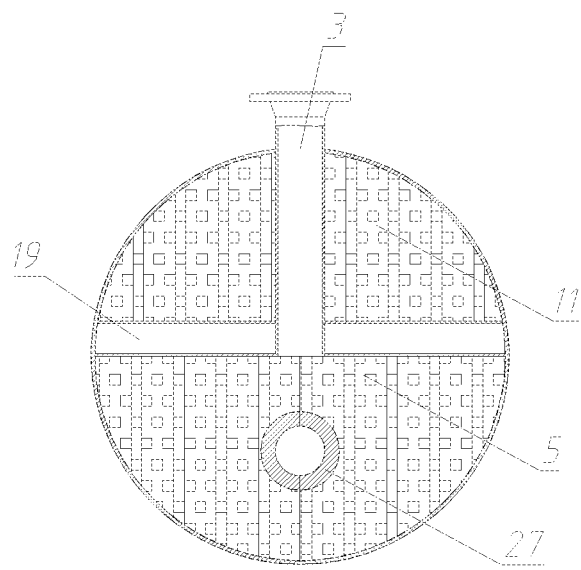
FIG. 2 is a section structure diagram of the sectional structure of Section A in FIG. 1.
Figure 3:
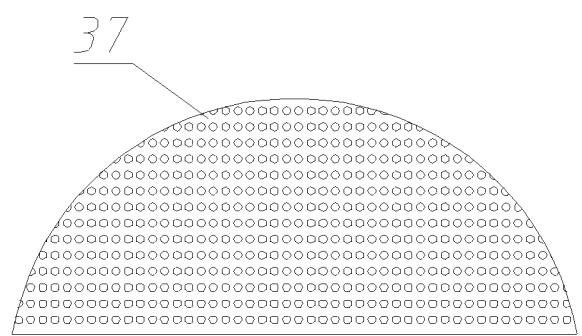
FIG. 3 is a schematic structural diagram of an embodiment of the sieve plate one of the integrated wellhead device for filtering injected and produced gases of the present disclosure.
Figure 4:
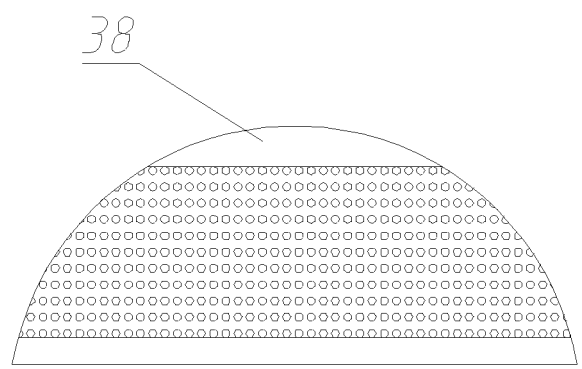
FIG. 4 is a schematic structural diagram of an embodiment of the sieve plate two of the integrated wellhead device for filtering injected and produced gases of the present disclosure.
Figure 5:
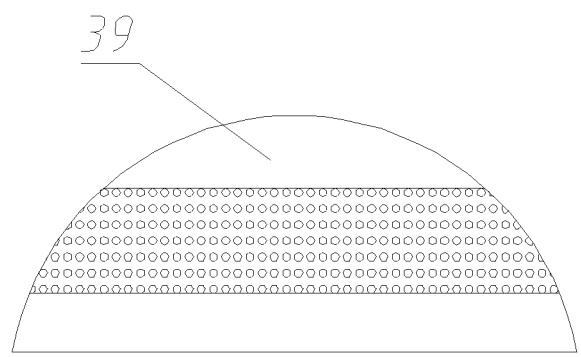
FIG. 5 is a schematic structural diagram of an embodiment of the sieve plate three of the integrated wellhead device for filtering injected and produced gases of the present disclosure.
Figure 6:
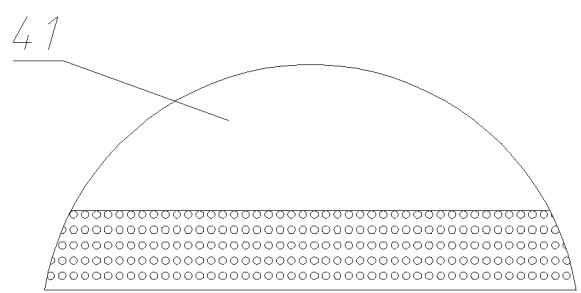
FIG. 6 is a schematic structural diagram of an embodiment of the sieve plate five of the integrated wellhead device for filtering injected and produced gases of the present disclosure.
Figure 7:
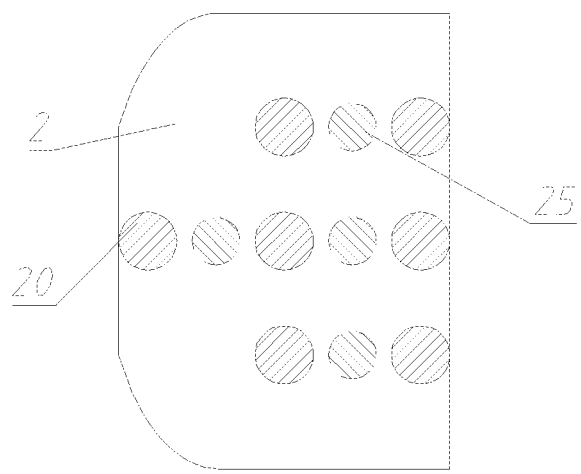
FIG. 7 is a schematic top view of the spacer plate of the wellhead gas filtering device for the integrated injection-production well of the present disclosure.

As shown in FIG. 1 to FIG. 7, the present disclosure provides an integrated wellhead device for filtering injected and produced gases, comprising a horizontal tank (1) and spacer plates (2) inside the horizontal tank (1), wherein the spacer plates (2) divide the internal space of the horizontal tank (1) into an upper space, a lower space and a right space, the upper space and the lower space are connected to the right space, and an injected gas filtering system and a produced gas filtering system are provided in the horizontal tank (1);

the injected gas filtering system comprises an injected gas inlet (3), an injected gas channel (4), an oxygen removal chamber (5), and an injected gas outlet (6) that are connected in sequence; the injected gas inlet (3) is fitted on the top of the horizontal tank (1), the injected gas channel (4) penetrates the spacer plate (2) and is connected with the oxygen removal chamber (5) located in the lower space, and the injected gas outlet (6) is fitted at the bottom of the horizontal tank (1);

the produced gas filtering system comprises a filtering system, a quasi-overpressure gas direct drainage system, and an overpressure gas direct drainage system;

the filtering system comprises a produced gas inlet (7), a gas deposition chamber (8), a gas removal chamber, a gas retention chamber (9), a gas acceleration channel, and a produced gas outlet (10) that are sequentially connected; the gas removal chamber comprises oxygen removal chamber two (11), sulfur removal chamber (12) and carbon dioxide removal chamber (13) that are connected in any order; the right space is the gas retention chamber (9); the produced gas inlet (7) is located at the top left end of the horizontal tank (1), and the gas deposition chamber (8) and the gas removal chamber are located in the upper space, the gas acceleration channel is arranged in the lower space and penetrates the gas removal chamber 1 (5), and the produced gas outlet (10) is set at the left end of the horizontal tank (1); the gas deposition chamber (8) is provided with a pressure monitoring device (14);

the quasi-overpressure gas direct drainage system comprises a gas flow channel (15), a safety ball valve (16), a spring one (17), a spring fixing block one (18), and a quasi-overpressure gas direct drainage channel (19) that are connected in sequence; the spring fixing block one (18) is set on the spacer plate (2), and the quasi-overpressure gas direct drainage channel (19) is connected to the gas retention chamber (9);

the overpressure gas direct drainage system comprises a safety floating plate (20), a safety spring (21), a safety baffle (22), an overpressure gas drainage chamber (23), and a safety gas outlet (24) that are connected in sequence; the safety baffle (22) is provided with a overpressure gas drainage channel (25); the safety floating plate (20) is cut from the spacer plate (2), the safety baffle (22) is located in the lower space and faces the gas deposition chamber (8), a gap (26) is left between the safety baffle (22) and the spacer plate (2) and serves as a gas flow channel when the gas is overpressured, and the safety gas outlet (24) is arranged at the bottom of the horizontal tank (1).

What needs illustration is that the oxygen removal chamber one (5) and the oxygen removal chamber two (11) are provide with oxygen removal media which may be the same or different; the sulfur removal chamber (12) is provided with sulfur removal medium; the carbon dioxide removal chamber (13) is provided with carbon dioxide removal medium; the oxygen removal medium, the sulfur removal medium, and the carbon dioxide removal medium can all be corresponding degassing medium in the prior art.

When using the present disclosure, on the one hand, the gas from high-pressure injected gas source enters the inside of the device of the present disclosure from the injected gas inlet (3), and then reaches the oxygen removal chamber (5) through the injected gas channel (4) to remove oxygen in the high-pressure injected gas source; the deoxygenated gas is discharged into the gas injection well casing of the Christmas tree from the injected gas outlet (6).

On the other hand, the produced gas in the gas production tubing of the Christmas tree enters the gas deposition chamber (8) from the produced gas inlet (7).

When the pressure in the gas deposition chamber (8) exceeds the threshold 1 (quasi-overpressure), all the produced gas will enter the gas removal chamber to remove oxygen, sulfur and carbon dioxide in the produced gas; after oxygen removal, the gas is delivered to the gas retention chamber (9), then accelerated in the gas acceleration channel, and discharged from the produced gas outlet (10) into the produced gas delivery pipe;

when the pressure in the gas deposition chamber (8) exceeds the threshold 1 (quasi-overpressure), the gas pressure will jack up the safety ball valve (16) so that part of the produced gas is directly delivered to the gas retention chamber (9) through the quasi-overpressure gas drainage channel (19), and another part of the gas is discharged to the gas retention chamber (9) after being deoxidized in the gas removal chamber; when the pressure is restored (that is, the pressure is less than the threshold 1), the spring one (17) is restored and the safety ball valve (16) blocks the gas flow channel (15) again, making all the produced gas is discharged from the gas removal chamber to the gas retention chamber (9);

when the pressure in the gas deposition chamber (8) exceeds the threshold 2 (overpressure), the gas pressure will make the safety floating plate (20) move down to expose the gap (26) between the safety baffle (22) and the spacer plate (2), and then part of the produced gas is discharged from the overpressure gas drainage channel (25) to the overpressure gas drainage chamber (23), and then discharged into the temporary gas storage tank through the safety gas outlet (24); the rest produced gas is delivered into the gas retention chamber (9) through the gas removal chamber and the quasi-overpressure gas drainage channel (19); when the pressure is restored (that is, the pressure is less than the threshold 2), the safety spring (21) is restored, and the safety floating plate (20) rises to separate the gas deposition chamber (8) and the gap (26) so as to discharge all the produced gas from the gas removal chamber and the quasi-overpressure gas drainage channel (19) to the gas retention chamber (9).

It should be noted that the quasi-overpressure (pressure threshold 1) of the present disclosure is determined according to the safety ball valve (16) and the spring one (17) in the quasi-overpressure gas direct discharge system, and the overpressure (pressure threshold 2) is determined according to the safety floating plate (20) and the safety spring (21) in the overpressure gas direct discharge system. the user can set the safety ball valve (16), the spring one (17), the safety floating plate (20), and the safety spring (21) according to different needs, so as to obtain different forces required to push the safety ball valve (16) and the safety floating plate (20), that is, obtain pressure threshold 1 and pressure threshold 2 (the former is less than the latter).

In a specific embodiment, the horizontal tank (1) comprises a left end cap, a straight section, and a right end cap; the left end cap is detachably connected to the left end of the straight section, and the right end of the straight section is detachably connected to the right end cap.

In a specific embodiment, the gas acceleration channel comprises an acceleration channel of the acceleration cylinder (27) and an acceleration channel of the acceleration nozzle (28), and the right end of the acceleration cylinder (27) is connected to the gas retention chamber (9), the left end of the acceleration cylinder (27) is connected with the right end of the acceleration nozzle (28), and the left end of the acceleration nozzle (28) is connected with the gas outlet (10); the acceleration cylinder (27) is fixed by an acceleration cylinder positioning plate (29); the gas in the gas retention chamber (9) can be quickly discharged through the gas acceleration channel, so as to prevent any safety risk caused by excessive gas pressure in the gas retention chamber (9).

Optionally, the acceleration channel of the acceleration cylinder (27) comprises a first-stage acceleration channel (30), a straight section one (31), a second-stage acceleration channel (32), and a straight section two (33) that are sequentially connected from right to left; the acceleration channel of the acceleration nozzle (28) comprises a third-stage acceleration channel (34) and a straight section three (35) that are connected from right to left; the internal diameter of the left end of the first-stage acceleration channel (30) is smaller than that of the right end, the internal diameter of the left end of the second-stage acceleration channel (32) is smaller than that of the right end, and the internal diameter of the left end of the third-stage acceleration channel (34) is smaller than that of the right end.

In a specific embodiment, a speed-up cylinder (36) is provided between the first and second gas removal chambers; a speed-up cylinder channel is set at the center of the speed-up cylinder (36) to connect the two oxygen removal chambers; the internal diameter of the left end of the speed-up cylinder channel is greater than that of the right end.

In a specific embodiment, a sieve plate one (37) is provided between the first gas removal chamber and the gas deposition chamber, a sieve plate two (38) provided between the first gas removal chamber and the speed-up cylinder (36), a sieve plate three (39) provided between the speed-up cylinder (36) and the second gas removal chamber, a sieve plate four (40) provided between the second gas removal chamber and the third gas removal chamber, and a sieve plate five (41) provided between the third gas removal chamber and the gas retention chamber (9); the gas can be further filtered by the sieve plate between the gas removal chambers to improve the quality of the produced gas when is finally discharged.

Optionally, the number of sieve holes of the sieve plate one (37), sieve plate two (38), sieve plate three (39), and sieve plate five (41) is reduced in order, and the number of holes of the sieve plate four (40) is the same as that of the sieve plate one (37).

Optionally, the sieve plate five (41) is provided with a fixing plate (42) at its right end; the fixing plate (42) can further fix the sieve plate five (41), preventing the sieve plate five (41) in case of excessive gas pressure or excessive gas flow.

In a specific embodiment, the material separation baffle (43) is fitted in the gas removal chamber to divide the channel in the gas removal chamber into circular passages, making the produced gas contact with the oxygen removal medium in a wider area for a longer period of time, so that the produced gas can be filtered completely.

In a specific embodiment, a left baffle clamping plate (44) is provided in the horizontal tank (1) and comprises a upper left baffle clamping plate set inside the gas deposition chamber (8) and a lower left baffle clamping plate set between the overpressure gas drainage chamber (23) and the oxygen removal chamber one (5); the top of the upper left baffle clamping plate is connected with the internal top wall of the horizontal tank (1), and the height of the upper left baffle clamping plate is less than that of the upper space; the upper and lower ends of the lower left baffle clamping plate are respectively connected with the spacer plate (2) and the internal bottom wall of the horizontal tank (1); the upper left baffle allows the injected gas to be deposited in the gas deposition chamber (8) for a longer period of time, so that the gas deposited in the lower part flows into the gas removal chamber through the channel between the upper left baffle clamping plate and the spacer plate (2).

Optionally, the upper left baffle clamping plate is provided with a spring fixing block two (45) on the right, at the right end of the spring fixing block two (45) is provided with a spring two, and at the right end of the spring two (46) is provided with a hold-down plate (47). With the structure described in this embodiment, the space of the first gas removal chamber can be adjusted. When there is too much medium or too high air pressure in the first gas removal chamber, the sieve plate one (37) moves leftwards to squeeze the hold-down plate (47) and compress the spring two (46), thus expanding the space of the first gas removal chamber; when the medium or air pressure in the first gas removal chamber decreases, the spring two (46) restores to drive the sieve plate one (37) to move rightwards, thus dynamically adjusting the space of the first gas removal chamber. Alternatively, in this embodiment, the first gas removal chamber may be provided with a similar structure like sponge or honeycomb activated carbon, and the oxygen removal medium is set on the structure. Alternatively, the spring fixing block two (45) is provided with a groove, and the spring two (46) is fitted in the groove.

The above are not intended to limit the present disclosure in any form. Although the present disclosure has been disclosed as above with embodiments, it is not intended to limit the present disclosure. Those skilled in the art, within the scope of the technical solution of the present disclosure, can use the disclosed technical content to make a few changes or modify the equivalent embodiment with equivalent changes. Within the scope of the technical solution of the present disclosure, any simple modification, equivalent change and modification made to the above embodiments according to the technical essence of the present disclosure are still regarded as a part of the technical solution of the present disclosure.

What is claimed is:

1. An integrated wellhead device for filtering injected and produced gases, comprising a horizontal tank and spacer plates inside the horizontal tank, wherein the spacer plates divide the internal space of the horizontal tank into an upper space, a lower space and a right space, the upper space and the lower space are connected to the right space, and an injected gas filtering system and a produced gas filtering system are provided in the horizontal tank;

the injected gas filtering system comprises an injected gas inlet, an injected gas channel, an oxygen removal chamber, and an injected gas outlet that are connected in sequence; the injected gas inlet is fitted on the top of the horizontal tank, the injected gas channel penetrates the spacer plate and is connected with the oxygen removal chamber located in the lower space, and the injected gas outlet is fitted at the bottom of the horizontal tank;

the produced gas filtering system comprises a filtering system, a quasi-overpressure gas direct drainage system, and an overpressure gas direct drainage system;

the filtering system comprises a produced gas inlet, a gas deposition chamber, a gas removal chamber, a gas retention chamber, a gas acceleration channel, and a produced gas outlet that are sequentially connected; the gas removal chamber comprises oxygen removal chamber two, sulfur removal chamber and carbon dioxide removal chamber that are connected in any order; the right space is the gas retention chamber; the produced gas inlet is located at the top left end of the horizontal tank, and the gas deposition chamber and the gas removal chamber are located in the upper space, the gas acceleration channel is arranged in the lower space and penetrates the gas removal chamber one, and the produced gas outlet is set at the left end of the horizontal tank; the gas deposition chamber is provided with a pressure monitoring device;

the quasi-overpressure gas direct drainage system comprises a gas flow channel, a safety ball valve, a spring one, a spring fixing block one, and a quasi-overpressure gas direct drainage channel that are connected in sequence; the spring fixing block one is set on the spacer plate, and the quasi-overpressure gas direct drainage channel is connected to the gas retention chamber; and the overpressure gas direct drainage system comprises a safety floating plate, a safety spring, a safety baffle, an overpressure gas drainage chamber, and a safety gas outlet that are connected in sequence; the safety baffle is provided with a overpressure gas drainage channel; the safety floating plate is cut from the spacer plate, the safety baffle is located in the lower space facing the gas deposition chamber, a gap is left between the safety baffle and the spacer plate to provide a gas flow channel when the gas is overpressured, and the safety gas outlet is arranged at the bottom of the horizontal tank.

2. The integrated wellhead device for filtering injected and produced gases according to claim 1, wherein the horizontal tank comprises a left end cap, a straight section and a right end cap; the left end cap is connected to the left end of the straight section and is detachable, and the right end of the straight section is connected to the right end cap and is detachable.

3. The integrated wellhead device for filtering injected and produced gases according to claim 1, wherein the gas acceleration channel comprises an acceleration channel of the acceleration cylinder and an acceleration channel of the acceleration nozzle, and the right end of the acceleration cylinder is connected to the gas retention chamber, the left end of the acceleration cylinder is connected with the right end of the acceleration nozzle, and the left end of the acceleration nozzle is connected with the gas outlet; the acceleration cylinder is fixed by an acceleration cylinder positioning plate.

4. The integrated wellhead device for filtering injected and produced gases according to claim 3, wherein the acceleration channel of the acceleration cylinder comprises a first-stage acceleration channel, a straight section one, a second-stage acceleration channel, and a straight section two that are connected from right to left sequentially;

the acceleration channel of the acceleration nozzle comprises a third-stage acceleration channel and a straight section three that are connected from right to left; and the internal diameter of the left end of the first-stage acceleration channel is smaller than that of the right end, the internal diameter of the left end of the second-stage acceleration channel is smaller than that of the right end, and the internal diameter of the left end of the third-stage acceleration channel is smaller than that of the right end.

5. The integrated wellhead device for filtering injected and produced gases according to claim 1, wherein a speed-up cylinder is provided between the first and second gas removal chambers; a speed-up cylinder channel is set at the center of the speed-up cylinder to connect the two oxygen removal chambers; the internal diameter of the left end of the speed-up cylinder channel is greater than that of the right end.

6. The integrated wellhead device for filtering injected and produced gases according to claim 5, wherein a sieve plate one is provided between the first gas removal chamber and the gas deposition chamber, a sieve plate two is provided between the first gas removal chamber and the speed-up cylinder, a sieve plate three is provided between the speed-up cylinder and the second gas removal chamber, a sieve plate four is provided between the second gas removal chamber and the third gas removal chamber, and a sieve plate five is provided between the third gas removal chamber and the gas retention chamber.

7. The integrated wellhead device for filtering injected and produced gases according to claim 6, wherein the number of sieve holes of the sieve plates one, sieve plates two, sieve plates three and sieve plates five decreases in order, and the number of holes of the sieve plate four is the same as that of the sieve plate one.

8. The integrated wellhead device for filtering injected and produced gases according to claim 6, wherein the sieve plate five is provided with a fixing plate at its right end.

9. The integrated wellhead device for filtering injected and produced gases according to claim 6, wherein a left baffle clamping plate is provided in the horizontal tank and comprises a upper left baffle clamping plate set inside the gas deposition chamber and a lower left baffle clamping plate set between the overpressure gas drainage chamber and the oxygen removal chamber one; the top of the upper left baffle clamping plate is connected with the internal top wall of the horizontal tank, and the height of the upper left baffle clamping plate is less than that of the upper space; the upper and lower ends of the lower left baffle clamping plate are respectively connected with the spacer plate and the internal bottom wall of the horizontal tank.

10. The integrated wellhead device for filtering injected and produced gases according to claim 9, wherein the upper left baffle clamping plate is provided with a spring fixing block two on the right, at the right end of the spring fixing block two is provided with a spring two, and at the right end of the spring two is provided with a hold-down plate.

* * * * *